(12) United States Patent
Fujii

(10) Patent No.: US 12,309,757 B2
(45) Date of Patent: May 20, 2025

(54) BASE STATION AND RADIO COMMUNICATION SYSTEM

(71) Applicant: SoftBank Corp., Tokyo (JP)

(72) Inventor: Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/279,248

(22) PCT Filed: Feb. 8, 2022

(86) PCT No.: PCT/JP2022/004888
§ 371 (c)(1),
(2) Date: Aug. 29, 2023

(87) PCT Pub. No.: WO2022/185857
PCT Pub. Date: Sep. 9, 2022

(65) Prior Publication Data
US 2024/0172201 A1   May 23, 2024

(30) Foreign Application Priority Data
Mar. 2, 2021   (JP) ................................. 2021-032953

(51) Int. Cl.
*H04W 72/0453* (2023.01)
*H04B 7/06* (2006.01)
(Continued)

(52) U.S. Cl.
CPC ...... *H04W 72/0453* (2013.01); *H04B 7/0695* (2013.01); *H04W 16/28* (2013.01); *H04W 52/367* (2013.01); *H04W 72/20* (2023.01)

(58) Field of Classification Search
CPC . H04W 72/0453; H04W 72/20; H04W 16/28; H04W 52/367; H04B 7/0695
See application file for complete search history.

(56) References Cited

U.S. PATENT DOCUMENTS 10,476,575 B2    11/2019   Park et al.
11,064,463 B2    7/2021    Foster et al.
(Continued)

FOREIGN PATENT DOCUMENTS

JP    2000-183627 A    6/2000
JP    2006-93778 A     4/2006
(Continued)

OTHER PUBLICATIONS

International Preliminary Report on Patentability Dated Aug. 29, 2023 for PCT Application No. PCT/JP2022/004888.
(Continued)

*Primary Examiner* — Jasper Kwoh
(74) *Attorney, Agent, or Firm* — Muirhead and Saturnelli, LLC

(57) ABSTRACT

A base station and a radio communication system obtain a desired communication quality by suppressing an influence of interference between a cell in an upper-airspace area and a cell in a terrestrial area when a terminal apparatus is used in the upper-airspace area. The base station is provided with an antenna, a radio communication section for forming a first cell and a second cell above the first cell and performs radio communication via the antenna to and from terminal apparatuses in the different cells. A radio resource of the same frequency band is assigned to communicate with the terminal apparatus in either the first cell or the second cell in a same time period. When the radio resource is assigned to the terminal apparatus in the second cell, a transmission power control reduces transmission power that is applied to the terminal apparatus to which the radio resource is assigned.

18 Claims, 13 Drawing Sheets

(51) Int. Cl.
  *H04W 16/28* (2009.01)
  *H04W 52/36* (2009.01)
  *H04W 72/20* (2023.01)

(56) References Cited

U.S. PATENT DOCUMENTS

| | | | |
|---|---|---|---|
| 11,290,997 | B2 | 3/2022 | Tomeba et al. |
| 11,929,802 | B2* | 3/2024 | Xue ........................ H01Q 19/18 |
| 2009/0177593 | A1 | 7/2009 | Natsuno et al. |
| 2018/0198499 | A1 | 7/2018 | Park et al. |
| 2019/0077508 | A1 | 3/2019 | Shimezawa et al. |
| 2020/0112942 | A1 | 4/2020 | Foster et al. |
| 2020/0145977 | A1* | 5/2020 | Kumar ................ H04W 56/001 |
| 2020/0322957 | A1 | 10/2020 | Tomeba et al. |
| 2021/0258100 | A1* | 6/2021 | Hassan Hussein ........................ H04W 72/0453 |
| 2022/0149929 | A1* | 5/2022 | Fujii ................ H04B 7/18513 |
| 2022/0182132 | A1* | 6/2022 | Hirai ..................... H04B 17/345 |
| 2022/0394500 | A1* | 12/2022 | Geng ..................... G08G 5/006 |
| 2022/0407587 | A1* | 12/2022 | Fujii ..................... H04B 7/0617 |
| 2023/0199596 | A1* | 6/2023 | Lee ................... H04W 36/0011 455/442 |

FOREIGN PATENT DOCUMENTS

| | | |
|---|---|---|
| JP | 2007-259289 A | 10/2007 |
| JP | 2018-528654 A | 9/2018 |
| JP | 2019-118035 A | 7/2019 |
| JP | 2020-078060 A | 5/2020 |
| WO | WO 2018-042927 A1 | 3/2018 |
| WO | WO 2018-159794 A1 | 9/2018 |

OTHER PUBLICATIONS

International Search Report and Written Opinion Dated for PCT Application No. PCT/JP2022/004888, Mar. 22, 2022.
Proceedings of the 2020 IEICE general conference: Communication 1, p. 300.
Notice for Reasons of Refusal for Japanese Patent Application No. 2021-032953, Dated Mar. 11, 2022.
Decision of Refusal for Japanese Patent Application No. 2021-032953, Dated Sep. 28, 2022.

* cited by examiner

BASE STATION AND RADIO COMMUNICATION SYSTEM

TECHNICAL FIELD

The present invention relates to a base station and a radio communication system of a mobile communication.

BACKGROUND ART

In conventional mobile communications, a fixed base station such as a macro-cell base station and a small-cell base station (see Patent Literatures 1 and 2, for example), which wirelessly communicates with a terminal apparatus that is a mobile station, is disposed on the ground, and the base station performs wireless communications plural terminal apparatuses.

CITATION LIST

Patent Literature

Patent Literature 1: Patent Application Publication No. 2006-093778.
Patent Literature 2: Patent Application Publication No. 2007-259289.

SUMMARY OF INVENTION

Technical Problem

In recent years, in the mobile communications, there has been a demand for a use of terminal apparatus in an upper airspace. For example, as a method of communicating with a drone (unmanned aerial vehicle), a use of mobile communication via a base station disposed on the ground is under consideration. However, the conventional base station disposed on the ground is generally designed on the premise that the terminal apparatus is located in a terrestrial area (which is an area up to a certain height from the ground, for example, a spatial area below an antenna of the base station), and the use of the terminal apparatus in the upper airspace is unexpected. Therefore, an interference occurs between the cell formed in the terrestrial area and the cell formed in the upper-airspace area, and there is a possibility that a desired communication quality cannot be obtained when the terminal apparatus is used in the upper-airspace area.

Solution to Problem

A base station of a mobile communication according to an aspect of the present invention comprises: an antenna; a radio communication section for forming a first cell below the antenna and a second cell above the first cell, which are capable of using a same frequency band, and performing a radio communication via the antenna to and from a terminal apparatus in the first cell and a terminal apparatus in the second cell; and a resource assignment section for assigning a radio resource of the same frequency band to a communication with the terminal apparatus in any one cell of the first cell and the second cell in a same time period, and not assigning the radio resource of the same frequency band to communication with a terminal apparatus in an other cell, wherein the base station applies a transmission power control for reducing transmission power to the terminal apparatus to which the radio resource of the same frequency band is assigned, when assigning the radio resource of the same frequency band to the terminal apparatus in the second cell.

A base station of a mobile communication according to another aspect of the present invention comprises: an antenna; a radio communication section for forming a first cell below the antenna and a second cell above the first cell, which are capable of using a same frequency band, and performing a radio communication via the antenna to and from a terminal apparatus in the first cell and a terminal apparatus in the second cell; and a resource assignment section for assigning a radio resource of the same frequency band to each of a communication with the terminal apparatus in the first cell and a communication with the terminal apparatus in the second cell in a same time period, wherein the base station applies a transmission power control for reducing a transmission power to the terminal apparatus in the second cell to which the radio resource of the same frequency band is assigned.

A base station of a mobile communication according to yet another aspect of the present invention comprises: an antenna; a radio communication section for forming a first cell below the antenna and a second cell above the first cell, which are capable of using a same frequency band, and performing a radio communication via the antenna to and from a terminal apparatus in the first cell and a terminal apparatus in the second cell; an altitude specifying section for specifying an altitude of the terminal apparatus in the second cell; and a resource assignment section for assigning a radio resource of the same frequency band to each of a communication with the terminal apparatus in the first cell and a communication with the terminal apparatus in the second cell, so that the terminal apparatus in the first cell and the terminal apparatus in the second cell time-divisionally use the same frequency band when the altitude of the terminal apparatus in the second cell becomes less than a predetermined altitude, and the terminal apparatus in the first cell and the terminal apparatus in the second cell simultaneously use the same frequency band when the altitude of the terminal apparatus in the second cell becomes equal to or higher than the predetermined altitude.

In the foregoing base station, the antenna may be an antenna capable of forming a beam of the first cell and a beam of the second cell, and the base station may determine that the altitude of the terminal apparatus in the second cell becomes equal to or higher than the predetermined altitude, in case that the terminal apparatus in the second cell selects the beam of the second cell.

In the foregoing base station, the antenna may be an antenna capable of continuously changing a direction of a beam in a virtual vertical plane centered on the antenna, and the base station may determine that the altitude of the terminal apparatus in the second cell is equal to or higher than the predetermined altitude, in case that an upward angle of the direction of the beam in the virtual vertical plane of the antenna with respect to the horizontal plane is equal to or higher than a predetermined angle.

In the foregoing base station, the antenna may be an antenna capable of forming plural beams having directivities in mutually different directions in a virtual vertical plane centered on the antenna, and the base station may comprise a control section for performing a beamforming control of the antenna so as to form one or more beams forming the first cell and one or more beams forming the second cell.

In the foregoing base station, the antenna may be a Massive antenna in which plural antenna elements are disposed, and the control section may store amplitude and phase values for each antenna element of the antenna, with respect to plural preset beam candidates in mutually different directions, select one of the plural beam candidates based on beam selection information received from the terminal apparatus, and perform a beamforming control so as to form a beam used for a communication with the terminal apparatus based on the amplitude and phase of each antenna element stored for the selected beam candidate.

In the foregoing base station, the antenna may be a Massive antenna in which plural antenna elements are disposed, and the control section may receive radio waves from the terminal apparatus while changing a pointing direction of the antenna in a virtual vertical plane centered on the antenna, detect a direction in which a reception power of radio waves from the terminal apparatus is maximized, and perform a beamforming control so as to form a beam used for a communication with the terminal apparatus in the detected direction.

In the foregoing base station, the base station may comprise a terminal control section for transmitting control information to the terminal apparatus so that the beam formed by the antenna of the terminal apparatus in the second cell is directed toward the base station.

Advantageous Effects of Invention

According to the present invention, when a terminal apparatus is used in an upper airspace, a desired communication quality can be obtained by suppressing an influence of an interference between a cell in the upper-airspace area and a cell in the terrestrial area, in case that a terminal apparatus is used in the upper-airspace area.

DESCRIPTION OF EMBODIMENTS

Hereinafter, embodiments of the present invention are described with reference to the drawings.

A system according to embodiments described herein is a radio communication system for realizing a same-frequency sharing between a terrestrial cell and an upper-airspace cell, in constructing an "upper-airspace service area" for mobile communication that is expected by realizing a drone, a flying car (taxi) and the like, together with a terrestrial service area for mobile communication.

Figure 1:
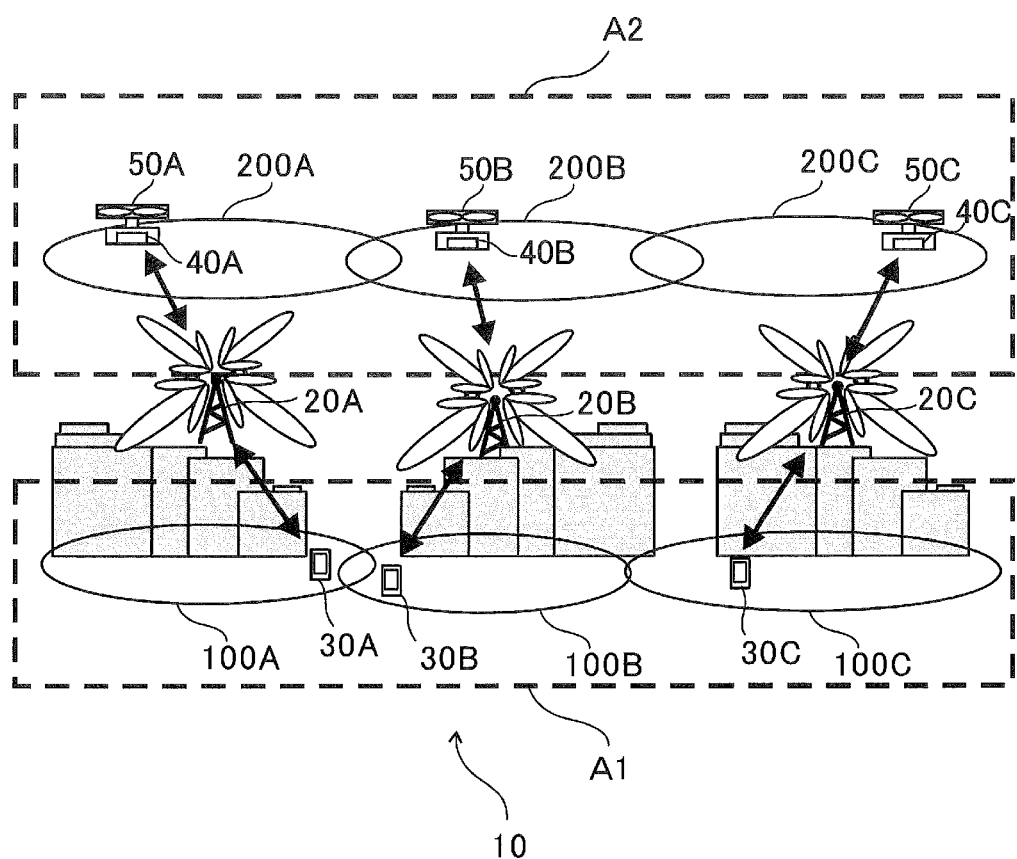
FIG. 1 is an illustration showing an example of a configuration of a radio communication system according to an embodiment.

FIG. 1 is an illustration showing an example of a configuration of a radio communication system according to the present embodiment.

A radio communication system 10 according to the present embodiment includes plural base stations 20A to 20C. The radio communication system 10 may include plural base stations 20A to 20C, and plural terminal apparatuses 30A to 30C and 40A to 40C that respectively perform a radio communication with these base stations. Although three base stations 20A to 20C and six terminal apparatuses 30A to 30C and 40A to 40C are shown in FIG. 1, the number of base stations and terminal apparatuses is arbitrary.

A radio technology in the radio communication system 10 of the present embodiment is, for example, a radio technology conforming to the LTE (Long Term Evolution)/LTE-Advanced standard. The radio technology in the radio communication system 10 may be another radio technology, such as a radio technology in the next generation standard such as the fifth generation (5G), etc.

The base stations 20A to 20C are respectively called, for example, an eNodeB, gNodeB, etc., and respectively relay a communication between the terminal apparatuses 30A to 30C, 40A to 40C and the mobile communication network.

The terminal apparatuses 30A to 30C and 40A to 40C can connect to the mobile communication network via the base stations 20A to 20C and perform various kinds of communications. The terminal apparatus is called, for example, a user equipment (UE) because it is used by a user of a communication service. Further, the terminal apparatus is sometimes called a mobile station or a mobile equipment because it is movable, and sometimes called a radio equipment.

Cells as radio communication areas formed by the respective base stations 20A to 20C of the present embodiment include terrestrial cells 100A to 100C as first cells formed in a terrestrial service area (hereinafter referred to as "terrestrial area") A1, and upper-airspace cells 200A to 200C as second cells formed in an upper-airspace service area (hereinafter referred to as an "upper-airspace area") A2.

Similar to the existing general base stations, the terrestrial cells 100A to 100C are two-dimensional or three-dimensional radio communication areas for respectively performing a radio communication with the terminal apparatuses (hereinafter also referred to as "terrestrial terminals") 30A, 30B, and 30C located in the terrestrial area A1 which is an area up to a certain height from the ground, for example, an area more downward than the antenna of the base station). On the other hand, the upper-airspace cells 200A to 200C are two-dimensional or three-dimensional radio communication areas for respectively performing a radio communication with the terminal apparatuses (hereinafter also referred to as "upper-airspace terminals") 40A, 40B, and 40C located in the upper-airspace area A2 more upward than the terrestrial area A1.

The terrestrial terminals 30A, 30B and 30C located in the terrestrial area A1 are, for example, mobile communication terminals such as smart phones and tablet terminals carried by pedestrians, communication terminals mounted on IoT devices (sensors, cameras, etc.) installed in buildings on the ground, communication terminals mounted on terrestrial vehicles such as automobiles and trains, or the like.

The upper-airspace terminals 40A, 40B, and 40C located in the upper-airspace area A2 are, for example, communication terminals respectively mounted on flying objects such as unmanned drones (UAV: Unmanned Aerial Vehicle), manned drones, flying automobiles (taxi), and helicopters, etc. The upper-airspace terminal 40B may be a portable communication terminal such as a smartphone or a tablet terminal possessed by a passenger boarding a flying object such as an aircraft or a helicopter. In the present embodiment, as shown in FIG. 1, a case is described in which the upper-airspace terminal 40B is a communication terminal mounted on a drone 50B.

In the present embodiment, each of the base stations 20A to 20C, the terrestrial terminals 30A, 30B, 30C, and the upper-airspace terminals 40A, 40B, 40C performs a radio communication using radio resources (frequency resources, time resources) assigned in each cell in a predetermined frequency band. The assignment of radio resources is managed by, for example, the base stations 20A to 20C.

Duplex methods of uplink and downlink for radio communications between the base stations 20A to 20C and the terrestrial terminals 30A, 30B, 30C and between the base stations 20A to 20C and the upper-airspace terminals 40A, 40B, 40C are not limited to specific methods, and may be, for example, a time division duplex method (Time Division Duplex: TDD) or a frequency division duplex method (Frequency Division Duplex: FDD). An access method for the radio communication is not limited to the specific method, but may be, for example, an FDMA (Frequency Division Multiple Access) method, a TDMA (Time Division Multiple Access) method, a CDMA (Code Division Multiple Access) method, or an OFDMA (Orthogonal Frequency Division Multiple Access).

Figure 2A:
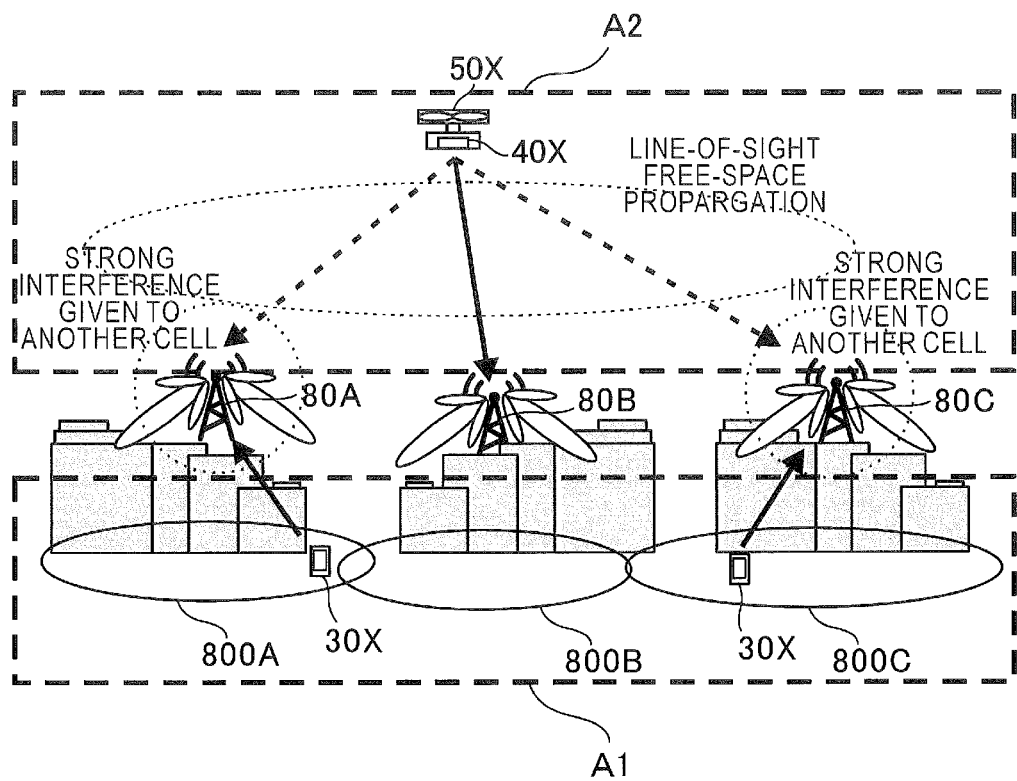
FIG. 2A is an illustration showing a state of occurrence of interference in uplink and downlink communications of a radio communication system of a comparative reference example.
Figure 2B:
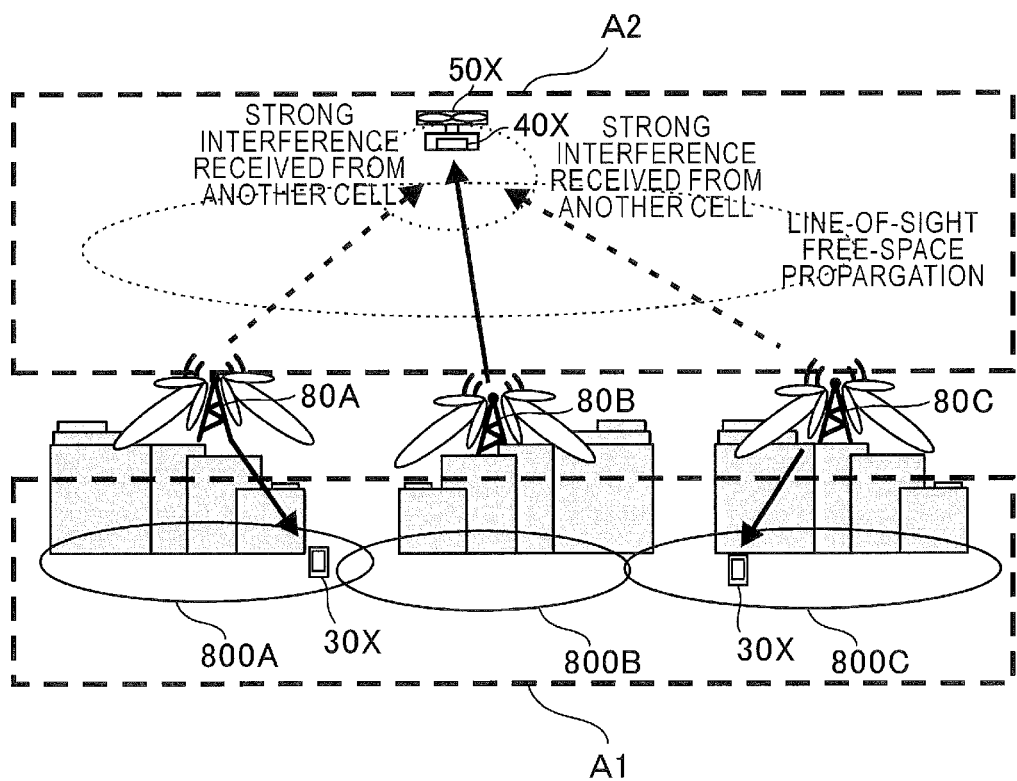
FIG. 2B is an illustration showing a state of occurrence of interference in uplink and downlink communications of a radio communication system of a comparative reference example.

Each of FIG. 2A and FIG. 2B is an illustration showing a state of occurrence of interference in each of uplink and downlink communications in a radio communication system of a comparative reference example. As shown in FIG. 2A and FIG. 2B, in a cell configuration in which the plural base stations 80A to 80C respectively forms terrestrial cells 800A to 800C without forming an upper-airspace cell, in the case of using an upper-airspace terminal 40X mounted on a drone or the like located in the upper-airspace area A2, an interference may occur in each of the uplink communication and the downlink communication.

For example, in the uplink communication from the upper-airspace terminal 40X mounted on the drone 50X to the base station 80B on the ground shown in FIG. 2A, since the spaces between the plural base stations 80A to 80C and the upper-airspace terminal 40X is respectively a line of sight without any obstacle, a giving interference may occur, which causes a strong interference to the terrestrial terminal 30X of the other neighboring cells 800A and 800C. Although it is conceivable to apply a transmission power control for reducing a transmission power of the upper-airspace terminal 40X in the uplink, the giving interference may not be sufficiently suppressed by the transmission power control.

In the downlink communication from the base station 80B on the ground to the upper-airspace terminal 40X shown in FIG. 2B, since the space between the upper-airspace terminal 40X and each of the plural base stations 80A to 80C on the ground is a line of sight without an obstacle, a receiving interference may occur, by which the upper-airspace terminal 40X respectively receives a strong interference from the base stations 80A and 80C of the other neighboring cells 800A and 800C.

Figure 3:
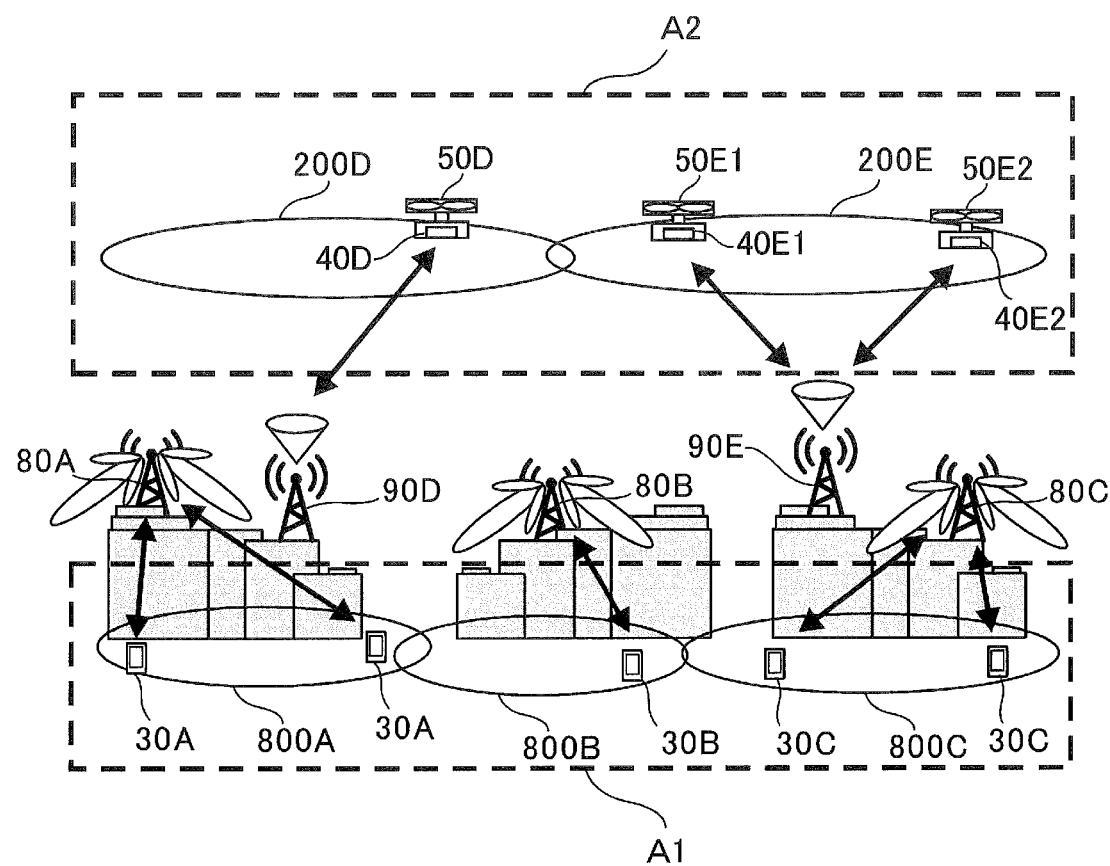
FIG. 3 is an illustration showing a configuration of a radio communication system in which an upper-airspace cell is formed by a base station different from a base station of a terrestrial cell according to a comparative reference example.

In order to avoid the interference, as shown in FIG. 3, a three-dimensional cell configuration is conceivable, in which the upper-airspace cells 200D and 200E for exclusive use of the upper airspace are formed by the base stations 90D and 90E that are different from the base stations 80A to 80C of the terrestrial cells 800A to 800C. In this cell configuration, the base stations 90D and 90E for exclusive use of the upper airspace can wirelessly communicate with the upper-airspace terminals 40D, 40E1 and 40E2 mounted on the drones 50D, 50E1 and 50E2 located in the upper-airspace area A2. However, in this cell configuration, the base stations 90D and 90E of the upper-airspace cells 200D and 200E are required in addition to the base stations 80A to 80C of the terrestrial cells 800A to 800C. In order to avoid an interference between the terrestrial cells 800A to 800C and the upper-airspace cells 200D and 200E, a frequency band (Band) different from that of the terrestrial cells 800A to 800C is required as the frequency band for the upper-airspace cells 200D and 200E.

Therefore, in the present embodiment, as shown in FIG. 1 and FIG. 4A to FIG. 13 described later, the upper-airspace cells 200A to 200C and the terrestrial cells 100A to 100C, which are vertically adjacent to each other, are formed by the base stations 20A to 20C that can be commonly used, and the same frequency band is used for the upper-airspace cells 200A to 200C and the terrestrial cells 100A to 100C.

Particularly, in the radio communication system of FIG. 1, the common-use base stations 20A to 20C unitarily manage radio resources (frequency resources, time resources) for the vertically adjacent upper-airspace cells 200A to 200C and terrestrial cells 100A to 100C, which use the same frequency band, thereby avoiding a mutual interference between the terrestrial cells 100A to 100C and the upper-airspace cells 200A to 200C.

Moreover, in the example of the radio communication system of FIG. 1, since the upper-airspace cells 200A to 200C and the terrestrial cells 100A to 100C are formed in separate areas (terrestrial area A1 and upper-airspace area A2) viewed from the base stations 20A to 20C (that is, spatially divided), the mutual interference between the terrestrial cells 100A to 100C and the upper-airspace cells 200A to 200C can be more reliably avoided, by performing a space division multiplexing by a vertical in-plane beamforming control using an array antenna with relatively high directivity to form each cell 100A to 100C, 200A to 200C.

Figure 4A:
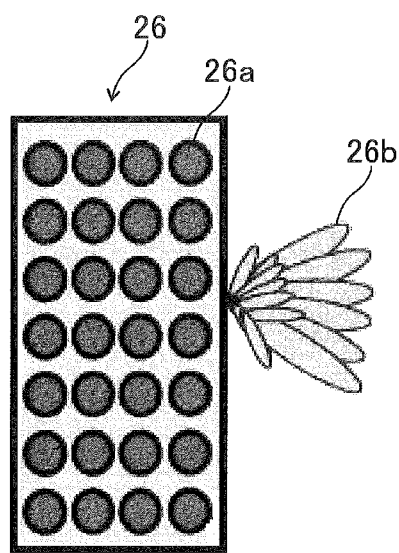
FIG. 4A is an illustration showing an example of a configuration of an antenna of a base station of an embodiment.

FIG. 4A is an illustration showing an example of a configuration of an antenna 26 of the base stations 20A to 20C of the present embodiment. The antenna 26 of the base stations 20A to 20C of the present embodiment is, for example, an antenna capable of forming plural beams having directivities in mutually different directions within a virtual vertical plane centered on the antenna. The antenna 26 may use an array antenna in which antenna elements composed of plural dipole antennas or patch antennas (planar antennas) are disposed, and form a beam with directivity by controlling the signal phase of each antenna element.

In the present embodiment, an antenna (hereinafter also referred to as "Massive antenna") is used as the antenna 26, that is composed of an array antenna in which plural antenna elements 26a are two-dimensionally or three-dimensionally disposed as shown in FIG. 4A, and that can be used for the Massive MIMO (Multiple-Input and Multiple-Output) transmission system having a beamforming function capable of controlling the number, beam width and beam direction of the antenna beams 26b.

The shape of the Massive antenna 26 is not limited to a specific shape. For example, the Massive antenna 26 is a planar Massive antenna 26 in which plural antenna elements 26a are disposed in a plane as exemplified in FIG. 4A. Plural planar Massive antennas 26 may be provided so as to form a beam of sector cell in each of the plural mutual different directions in a horizontal plane centered on the base station. The Massive antenna 26 may be a cylindrical Massive antenna 26 in which plural antenna elements 26a are disposed on the cylindrical outer peripheral surface and/or bottom surface.

The beam width and beam direction of the beam 26b formed by the Massive antenna 26 can be controlled in the horizontal and vertical directions. Since the Massive antenna 26 has a large number of antenna elements, for example, 128 at the maximum, it is also possible to assign dedicated radio waves to each user by using a technique such as a beamforming and a spatial multiplexing.

Figure 4B:
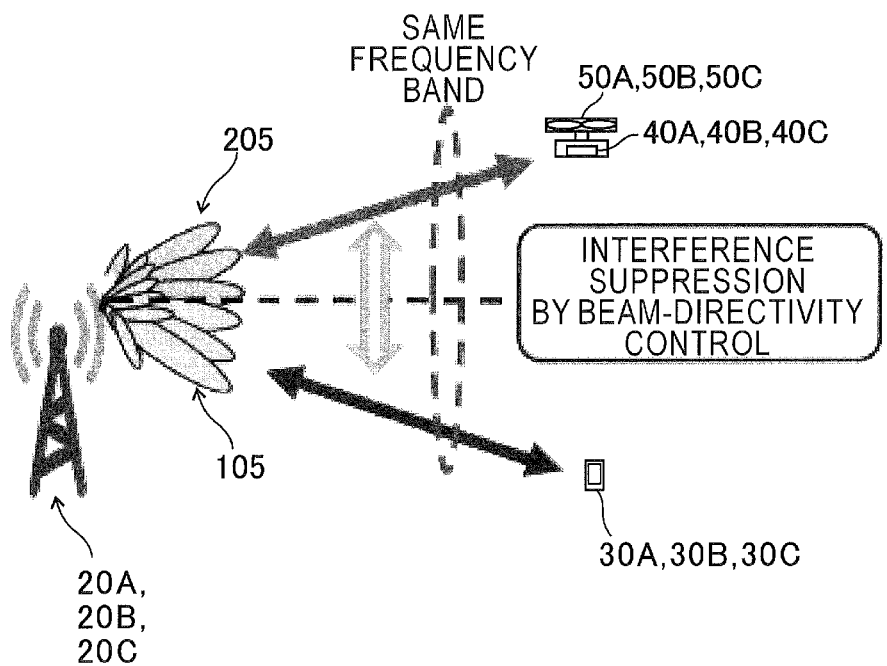
FIG. 4B is an illustration showing an example of a beam for upper airspace and a terrestrial beam formed by an antenna of a base station of an embodiment.

FIG. 4B is an illustration showing an example of a beam 205 for the upper airspace and a beam 105 for the ground formed by the antennas 26 of the base stations 20A to 20C of the present embodiment. Each of the base stations 20A to 20C of the present embodiment performs a spatial division multiplexing for separately forming the beam 105 for the ground and the beam 205 for the upper airspace in the same frequency band by a vertical in-plane beamforming using the Massive antenna 26, and suppress an interference between the terrestrial cells 100A to 100C and the upper-airspace cells 200A to 200C.

Figure 5:
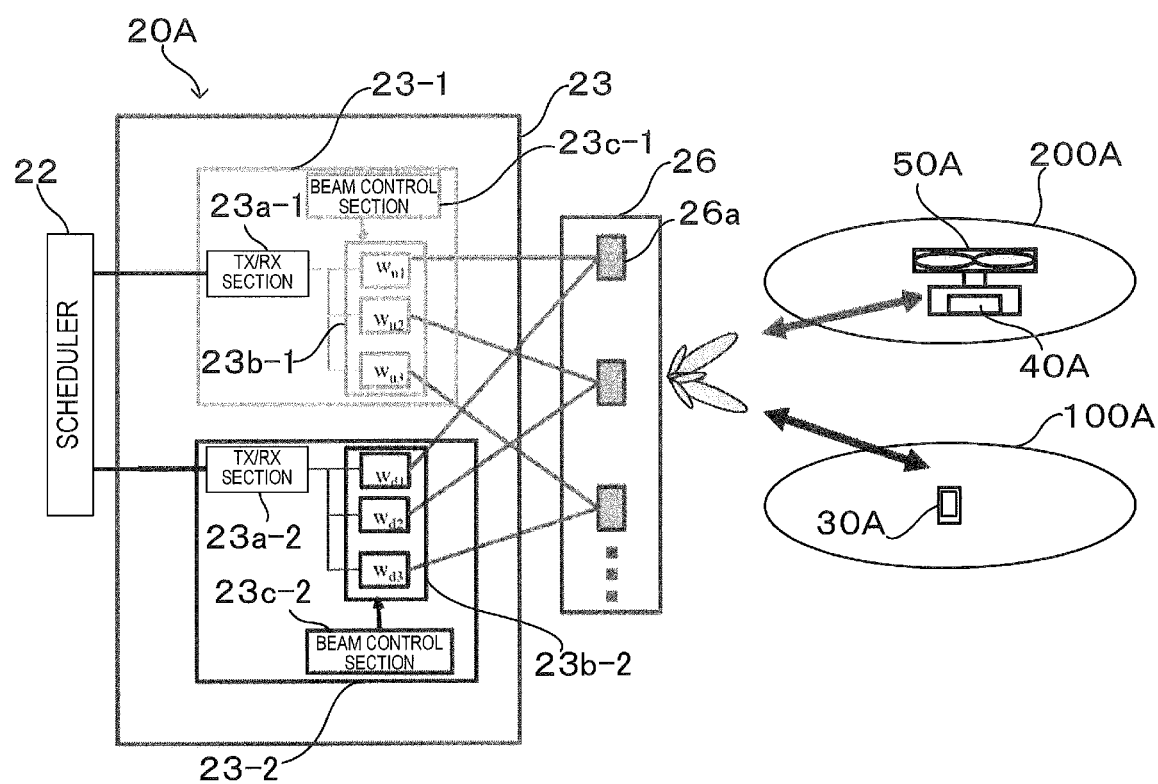
FIG. 5 is an illustration showing an example of a main configuration of a base station apparatus of a base station in an embodiment.

FIG. 5 is an illustration showing an example of the main configuration of the base station apparatus 21 of the base stations 20A to 20C according to the present embodiment.

In FIG. 5, the base station apparatus 21 of the base stations 20A to 20C is provided with a scheduler 22 and a radio communication section 23 that respectively performs a radio communication with the terminal apparatuses 40A to 40C via the antenna 26. In addition, the base station apparatus 21 is also provided with a control section for controlling and processing the entire base station apparatus 21, a storage section and so on. Although the base station apparatus 21 shown in FIG. 5 exemplifies that of the base station 20A forming the upper-airspace cell 200A and the terrestrial cell 100A, the base station apparatus of the other base stations 20B and 20C is also provided with the same main configuration as shown in FIG. 5.

The scheduler 22 has a function as a resource assignment section that assigns time resources and predetermined frequency resources (for example, F1, F2, F3, . . . ) in the same frequency band as radio resources to the terminal apparatuses 30A and 40A in the upper-airspace cell 200A and the terrestrial cell 100A. Accordingly, the radio resources are unitarily managed for the upper-airspace cell 200A and the terrestrial cell 100A that are vertically adjacent to each other.

The radio communication section 23 of the base station 20A is configured with a radio communication section 23-1 for upper-airspace cell, which forms the upper-airspace cell 200A, and a radio communication section 23-2 for terrestrial cell 23-2, which forms the terrestrial cell 100A. The radio communication section 23-1 for upper-airspace cell and the radio communication section 23-2 for terrestrial cell are respectively configured with transmission/reception (TX/RX) sections 23a-1 and 23a-2, precoding control sections 23b-1 and 23b-2, and beam control sections 23c-1 and 23c-2, and the configuration of each of the radio communication sections 23-1 and 23-2 is almost the same as each other.

Each of the transmission/reception section 23a-1 and 23a-2 of radio communication sections 23-1 and 23-2 is provided with, for example, a signal amplifying section for amplifying transmission signals and reception signals, a frequency conversion section for converting frequencies of transmission signals and reception signals to frequencies according to the scheduler 22, a radio-signal path switching section, a transmission/reception shared section (DUP: Duplexer), and the like.

The base stations 20A to 20C of the present embodiment respectively forms both cells of the terrestrial cells 100A to 100C and the upper-airspace cells 200A to 200C as shown in FIG. 1, by making it possible to change the number, width and direction of the beams of the antenna 26 by the beamforming function. In the present embodiment, as described above, the radio communication section 23 of the base station apparatus 21 is configured with the radio communication section 23-1 for upper-airspace cell and the radio communication section 23-2 for terrestrial cell, and the terrestrial cells 100A to 100C and the upper-airspace cells 200A to 200C have different configurations from each other. However, other components of the base station apparatus 21 (scheduler 22, antenna 26, components on the core network side of the scheduler 22, etc.) are shared by the terrestrial cells 100A to 100C and the upper-airspace cells 200A to 200C. Therefore, compared to the case where the upper-airspace cells 200D and 200E are formed by the base stations 20D and 20E different from the base stations 20A to 20C of the terrestrial cells 100A to 100C (see FIG. 3), the installation cost can be reduced by reducing the number of parts, etc.

In the case of transmitting data to the terminal apparatuses 30A and 40A of the terrestrial cell 100A and the upper-airspace cell 200A, each of the radio communication sections 23-1 and 23-2 in the base station 20A performs a precoding control on the transmission baseband signal transmitted from the transmission/reception sections 23a-1 and 23a-2 by the precoding control sections 23b-1 and 23b-2 respectively controlled by the beam control sections 23c-1 and 23c-2, and sends transmission signals to the antenna 26 configured with the array antenna. In the case of receiving data from the terminal apparatuses 30A and 40A, the reception data is obtained by the transmission/reception sections 23a-1 and 23a-2 via the precoding control sections 23b-1 and 23b-2, from the reception signal received by the antenna 26.

The radio communication sections 23-1 and 23-2 are respectively is provided with a beamforming function for performing the transmission and reception with a predetermined number of beams, beam width and beam direction using the antenna 26, by the precoding control sections 23b-1 and 23b-2 operating under the control of the beam control sections 23c-1 and 23c-2. Candidate data for plural types of precoding weights (beam patterns), which can be used in the beamforming function, are stored in the storage section of the base station apparatus 21.

Herein, the beamforming function by precoding is a function of preparing plural types (N) of pairs of signal phases (precoding weight matrices) for each antenna element 26a of the antenna 26 (array antenna) so as to receive a beam transmitted in a specific direction or a beam from a specific direction, selecting one precoding weight matrix from among them, performing the precoding control, and controlling the beam. The precoding weight matrix is a matrix that indicates control amount of phase and amplitude to be set for a multi-element antenna 201 when transmitting or receiving radio signals.

In the present embodiment, the terminal apparatuses 30A and 40A, which are located in the terrestrial cell 100A and the upper airspace cell 200A (beam forming area of the antenna 26) of the base station 20A, measure the reception power of the beams, and select the beam with the maximum reception power. This selection result information is sent from the terminal apparatuses 30A and 40A to the base station 20A, and the beam control sections 23c-1 and 23c-2 of the base station 20A select a beam pattern (precoding weight matrix) based on the selection result information, and control the precoding control sections 23b-1 and 23b-2. Thereby, the beam of the antenna 26 is controlled according to the selected precoding weight matrix, and a beam with high directivity toward the terminal apparatuses 30A and 40A is formed.

In this way, the base station 20A in the present embodiment performs a radio communication with the terminal apparatuses 30A and 40A, which are respectively located in the vertically adjacent terrestrial cell 100A and upper-airspace cell 200A, by using highly directional beams formed with the beam forming function. Therefore, between the beams for the terminal apparatuses 30A and 40A respectively located in the vertically adjacent terrestrial cell 100A and upper-airspace cell 200A, the beams can be spatially separated enough.

By concentrating the transmission/reception power in the direction of the terminal apparatus using such beamforming function, an antenna gain is improved, and it is possible to improve the communication quality and the like. Furthermore, as a result of improving the reception power at the base station 20A by improving the antenna gain, by performing the transmission power control on the side of the terminal apparatuses 30A and 40A, it is possible to reduce the transmission power on the side of the terminal apparatuses 30A and 40A. By reducing the transmission power on the side of the terminal apparatuses 30A and 40A, the interference between the vertically adjacent terrestrial cell 100A and upper-airspace cell 200A can be further suppressed. Further, by keeping the transmission power of the terminal apparatuses 30A and 40A low, it is possible to narrow the range where the radio waves reach. Therefore, for example, uplink radio waves from the upper-airspace terminal 40A in the upper-airspace cell 200A are less likely to reach the base stations of other neighboring cells, and a radio-wave interference can be suppressed.

It is noted that, although the base station 20A of the present embodiment adopts the beamforming function with the precoding control, it may adopt a beamforming function with a continuous tracking control that continuously tracks the beam in the direction of the terminal apparatus, for example. The continuous tracking control is realized by, for example, measuring the reception power when radio waves from the terminal apparatuses 30A and 40A located in the terrestrial cell 100A and the upper-airspace cell 200A are received by the base station 20A, detecting the direction in which the reception power is maximized by sweeping the pointing direction of the antenna 26, and setting the beam direction to the detected direction.

Next, a three-dimensional spatial cell configuration by a radio-resource assignment process in the same frequency band in the present embodiment is described.

Configuration Example 1

Figure 6:
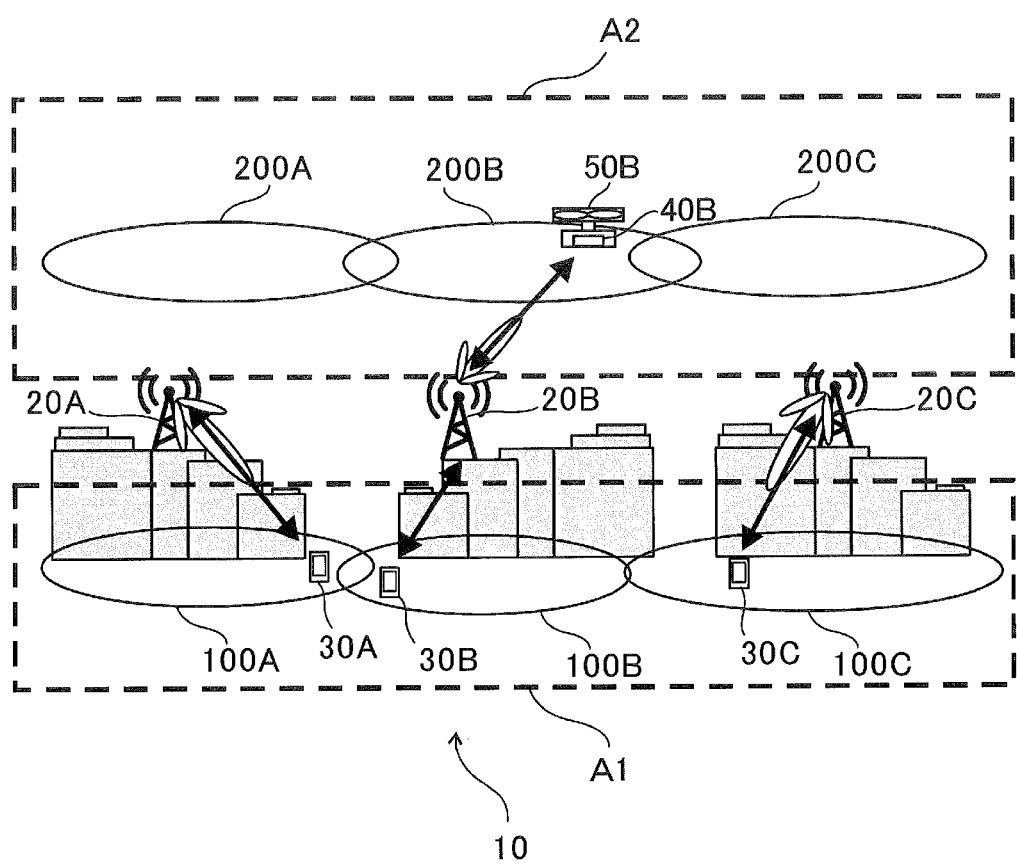
FIG. 6 is an illustration showing an example of a three-dimensional spatial cell configuration in one configuration example (configuration example 1) of a radio communication system according to an embodiment.

FIG. 6 is an illustration showing an example of a three-dimensional spatial cell configuration in one configuration example (configuration example 1) of the radio communication system according to the present embodiment. An example of the three-dimensional spatial cell configuration (hereinafter, the present example is referred to as "configuration example 1") formed by the radio-resource assignment process in the present embodiment is described with reference to FIG. 6.

The radio-resource assignment process in the three-dimensional spatial cell configuration of the present configuration example 1 is a non-overlapping assignment process, in which a radio resource of the same frequency band is assigned to the communication with the terminal apparatus in any one cell of the terrestrial cell 100A and the upper-airspace cell 200A in the same time period, and a radio resource of the same frequency band is not assigned to the communication with the terminal apparatus in the other cell.

In the example of FIG. 6, the central base station 20B assigns radio resources of the same frequency band to the communication with the upper-airspace terminal 40B mounted on the drone 5B in the upper-airspace cell 200A in the same time period, and does not assign radio resources of the same frequency band to the communication with the terminal apparatus in the terrestrial cell 100B. On the other hand, each of the base stations 20A and 20C on both sides in FIG. 6 assigns radio resources of the same frequency band to the communication with the terrestrial terminals 30A and 30C in the terrestrial cells 100A and 100C in the same time period, and does not assign radio resources of the same frequency band to the communication with the upper-airspace terminals in the upper-airspace cells 200A and 200C.

Specifically, for example, in the case of assigning radio resources of the same frequency band to the upper-airspace terminal 40B in the upper-airspace cell 200B, the scheduler 22 in the base station apparatus 21 of the present configuration example 1 confirms that radio resources of the same frequency band are not assigned to the terrestrial terminals in the terrestrial cell 100B, also confirms radio resources of the same frequency band that have already been assigned to other upper-airspace terminals in the upper-airspace cell 200B, and assigns the foregoing radio resources of the same frequency band, which have not yet been assigned to the other upper-airspace terminals, to the upper-airspace terminal 40B in the upper-airspace cell 200B.

Similarly, for example, in the case of assigning radio resources to the terrestrial terminal 30A in the terrestrial cell 100A, the scheduler 22 confirms that radio resources of the same frequency band are not assigned to the terminal apparatuses in the upper-airspace cell 200A, also confirms radio resources of the same frequency band that have already been assigned to the other terrestrial terminals in the terrestrial cell 100A, and assigns the foregoing radio resources of the frequency band, which have not yet been assigned to the other terrestrial terminals, to the terrestrial terminal 30A in the terrestrial cell 100A.

Furthermore, in the present configuration example 1, a transmission power control for reducing a transmission power is applied to the upper-airspace terminal 40B in the upper-airspace cell 200B, in which the radio resource of the same frequency band is assigned to the communication with the base station 20B.

According to the present configuration example 1, in each of the base stations 20A, 20B, and 20C as shown in FIG. 6, since the communication in the same frequency band is assigned to only one of the upper-airspace terminals and the terrestrial terminals, the upper-airspace terminals and the terrestrial terminals are not used simultaneously in the cell of the same base station, thereby the interference between these cells can be stably suppressed, and the communication quality of each terminal apparatus is improved.

Moreover, according to the present configuration example 1, since the antenna gain is improved at each base station and the reception power at each base station can be improved, the transmission power can be greatly reduced by the transmission power control of the upper-airspace terminal 40B in the upper-airspace cell 200B, thereby the interference with the other terrestrial cells 100A and 100C can be greatly reduced.

Configuration Example 2

Next, another example of the three-dimensional spatial cell configuration formed by the radio-resource assignment process in the present embodiment (hereinafter, the present example is referred to as "configuration example 2") is described. In the description of the present configuration example 2, although the base station 20A is described as an example, the same description can be applied to the other base stations 20B and 20C.

Figure 7:
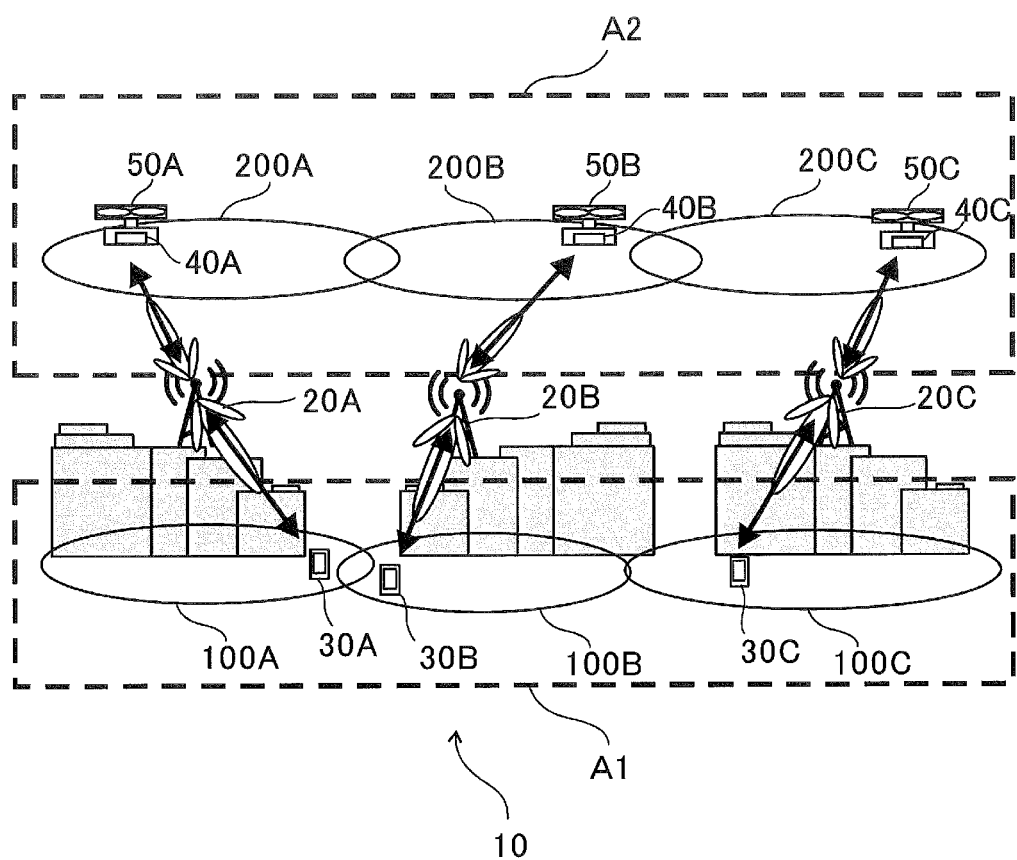
FIG. 7 is an illustration showing an example of a three-dimensional spatial cell configuration in another configuration example (configuration example 2) of a radio communication system according to an embodiment.

FIG. 7 is an illustration showing an example of a three-dimensional spatial cell configuration in another configuration example (configuration example 2) of the radio communication system according to the present embodiment. The radio-resource assignment process in the present configuration example 2 is an overlapping assignment process for assigning radio resources of the same frequency band to each of the communication with the terrestrial terminal 30A in the terrestrial cell 100A and the communication with the upper-airspace terminal 40A in the upper-airspace cell 200A in the same time period.

Specifically, for example, in the case of assigning radio resources to the upper-airspace terminal 40A in the upper-airspace cell 200A, the scheduler 22 in the base station apparatus 21 of the present configuration example 2 conforms radio resources of the same frequency band that have already been assigned to other upper-airspace terminals in the upper-airspace cell 200A, and assigns radio resources of the same frequency band, which have not yet been assigned to the other upper-airspace terminals, to the terminal apparatus 40A in the upper-airspace cell 200A.

The similar assignment is applied in the case of assigning radio resources to the terrestrial terminal 30A in the terrestrial cell 100A.

Also in the present configuration example 2, a transmission power control for reducing transmission power is applied to the upper-airspace terminal 40A in the upper-airspace cell 200A.

According to the present configuration example 2, in the base station 20A as shown in FIG. 7, radio resources of the same frequency band are assigned to both the upper-airspace terminal 40A in the upper-airspace cell 200A and the terrestrial terminal 30A in the terrestrial cell 100A in the same time period. Therefore, it is possible to improve the utilization efficiency of the frequency.

On the other hand, according to the present configuration example 2, there will be a case in which communication is performed in the same time period using radio resources in the same frequency band as each other between the terrestrial cell 100A and the upper-airspace cell 200A which are vertically adjacent to each other. Even in this case, since the beams between each of the terminal apparatuses 30A and 40A in the vertically adjacent terrestrial cell 100A and the upper-airspace cell 200A are spatially separated enough, even if radio resources of the same frequency band are assigned to the communications with these terminal apparatuses 30A and 40A at the same time, the interference can be suppressed.

Moreover, according to the present configuration example 2, the transmission power can be reduced by the transmission power control of the upper-airspace terminal 40A in the upper-airspace cell 200A, so that the interference to the terrestrial cells of the other base stations in the vicinity can be reduced.

Figure 8A:
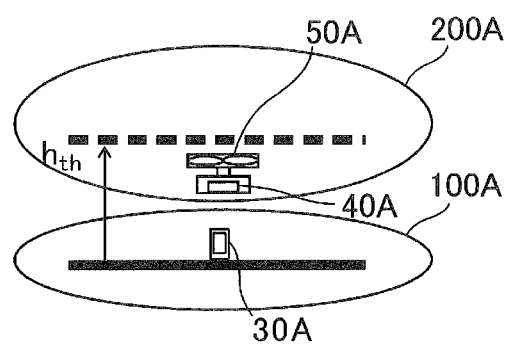
FIG. 8A is an illustration showing an example in which an altitude of an upper-airspace terminal is less than a predetermined altitude $h_{th}$.

Herein, in case that the beams between the terminal apparatuses 30A and 40A respectively located in the terrestrial cell 100A and the upper-airspace cell 200A, which are vertically adjacent to each other, are not spatially separated enough, if radio resources of the same frequency band are assigned between the terminal apparatuses 30A and 40A at the same time, the interference may not be sufficiently suppressed. For example, in case that the altitude of the terminal apparatus 40A in the upper-airspace cell 200A is less than the predetermined altitude $h_{th}$ as shown in FIG. 8A, the position of the terminal apparatus 40A in the upper-airspace cell 200A is close to the terrestrial cell 100A, so the interference may not be sufficiently suppressed.

Therefore, for the terminal apparatus 40A that is below the predetermined altitude $h_{th}$ among the upper-airspace terminals 40A in the upper-airspace cell 200A, for example, the non-overlapping assignment process of the same frequency resource F1 in the same frequency band as in the above-described configuration example 1 may be adopted, and for the terminal apparatus 40A that is equal to or higher than the predetermined altitude $h_{th}$, the overlapping assignment process of the same frequency resource F1 in the same frequency band as in the configuration example 2 may be adopted. In this case, the interference can be suppressed more stably.

Figure 8B:
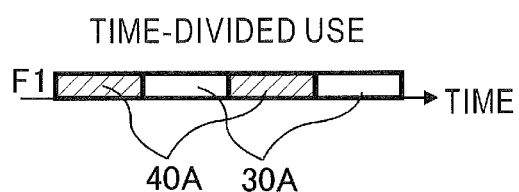
FIG. 8B is an illustration showing a time-division duplex process executed for a terrestrial terminal and an upper-airspace terminal to which the same frequency resource F1 is assigned.

For the terminal apparatus 40A that is below the predetermined altitude $h_{th}$, for example, as shown in FIG. 8B, the radio communication section 23 may perform a time-division duplex process for communicating in time division duplex (TDD: Time Division Duplex) with the terminal apparatus 30A in the terrestrial cell 100A and the terminal apparatus 40A in the upper-airspace cell 200A, to which the same frequency resource F1 in the same frequency band, is assigned by the scheduler 22, and may use the same frequency resource in time division duplex. According to this, the timing of performing a communication can be temporally shifted between the terrestrial terminal 30A and the upper-airspace terminal 40A, to which the same frequency resource F1 is respectively assigned in the same frequency band, so that the radio waves on the same frequency resource F1 are not used simultaneously (on the same time resource) between these terminal apparatuses 30A and 40A. Therefore, the interference is suppressed even if the altitude of the upper-airspace terminal 40A is less than the predetermined altitude $h_{th}$. It is noted that this time-division duplex process may also be applied to the upper-airspace terminal 40A that is equal to or higher than the predetermined altitude $h_{th}$.

On the other hand, in case that the beams between the terminal apparatuses 30A and 40A respectively located in the terrestrial cell 100A and the upper-airspace cell 200A, which are vertically adjacent to each other, are spatially separated enough, the interference is suppressed even if communications of the same frequency resource in the same frequency band are performed simultaneously in these terminal apparatuses 30A and 40A.

Figure 9A:
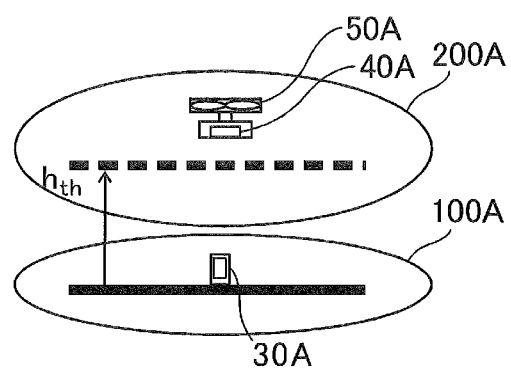
FIG. 9A is an illustration showing an example in which an altitude of an upper-airspace terminal is equal to or higher than a predetermined altitude $h_{th}$.
Figure 9B:
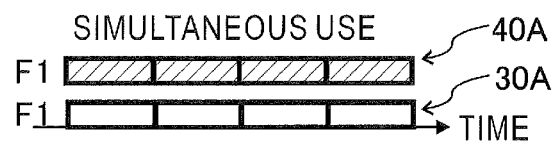
FIG. 9B is an illustration showing a simultaneous communication process that is performed for a terrestrial terminal and an upper-airspace terminal to which the same frequency resource F1 is assigned.

In case that the altitude of the upper-airspace terminal 40A is equal to or higher than the predetermined altitude $h_{th}$ in this way, for example, as shown in FIG. 9B, the radio communication section 23 may perform a simultaneous communication process for simultaneously communicating with the terrestrial terminal 30A and the upper-airspace terminal 40A to which the same frequency resource F1 in the same frequency band is assigned by the scheduler 22, and may simultaneously use the same frequency resource F1 in the same frequency band. According to this, it is possible to simultaneously perform the communications by the same frequency resource F1 in the same frequency band in the terrestrial terminal 30A and the upper-airspace terminal 40A using the same frequency band, so that the frequency utilization efficiency can be further improved than the time-division duplex process described above.

Configuration Example 3

Next, yet another example of the three-dimensional spatial cell configuration formed by the radio-resource assignment process in the present embodiment (hereinafter, the present example is referred to as "configuration example 3") is described. In the description of the present configuration example 3, although the base station 20A is described as an example, the same description can be applied to the other base stations 20B and 20C.

Figure 10:
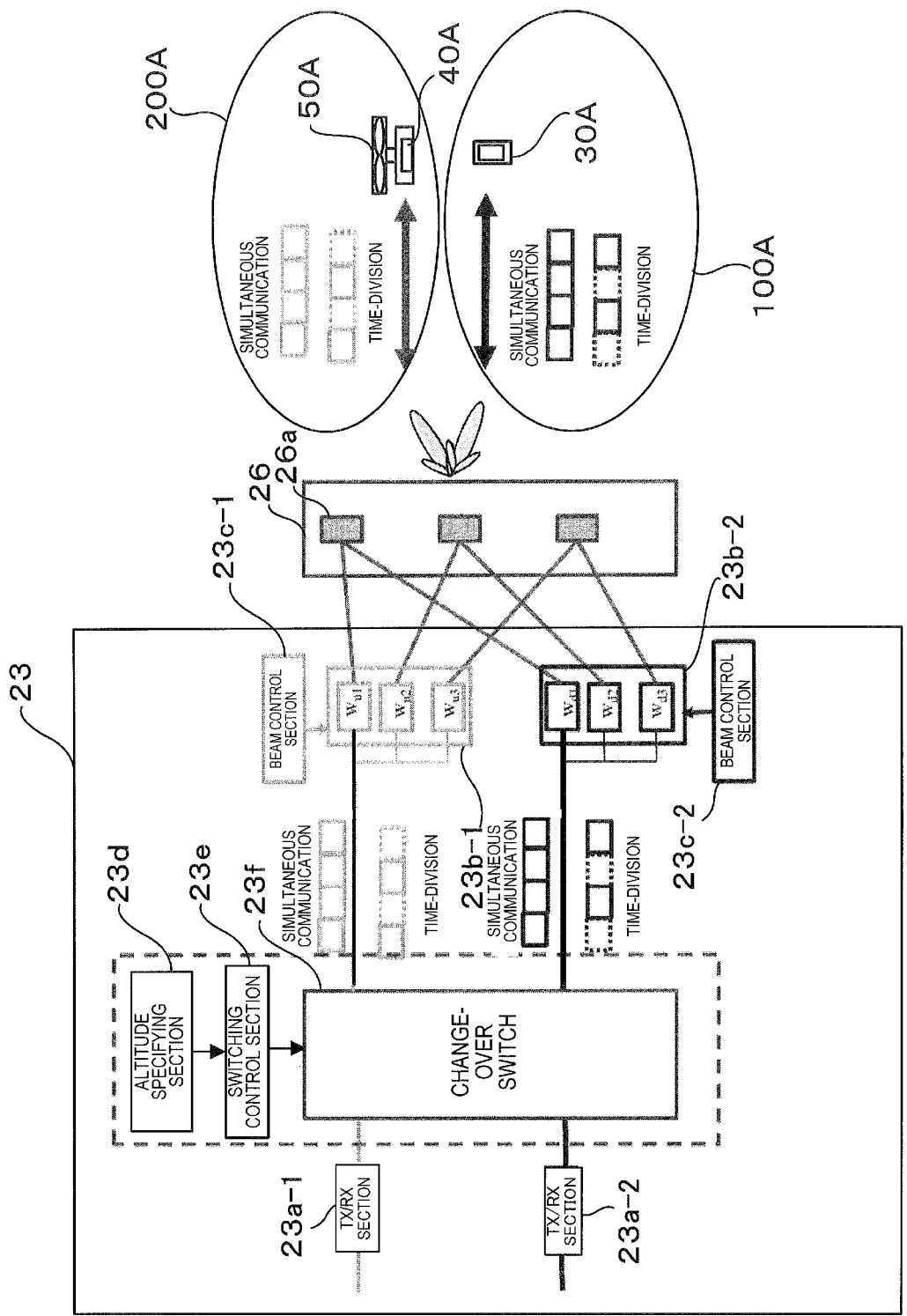
FIG. 10 is an illustration showing an example of a main configuration of a base station apparatus forming a three-dimensional spatial cell configuration in yet another configuration example (configuration example 3) of a radio communication system according to an embodiment.

FIG. 10 is an illustration showing an example of a main configuration of the base station apparatus 21 forming a three-dimensional spatial cell configuration in the yet another configuration example (configuration example 3) of the radio communication system according to the present embodiment.

The base station apparatus 21 according to the present configuration example 3 can perform a combination of the time-division duplex process shown in FIG. 8A and FIG. 8B and the simultaneous communication process shown in FIG. 9A and FIG. 9B described above.

Specifically, as shown in FIG. 10, the base station apparatus 21 is provided with an altitude specifying section 23d for specifying an altitude of the upper-airspace terminal 40A in the upper-airspace cell 200A. A simultaneous communication process (simultaneous use of the same frequency resource) is performed for the upper-airspace terminal 40A in the upper-airspace cell 200A specified by the altitude specifying section 23d as having an altitude equal to or higher than the predetermined altitude $h_{th}$. A time-division duplex process (time-division duplex use of the same frequency resource) is performed for the upper-airspace terminal 40A in the upper-airspace cell 200A specified by the altitude specifying section 23d as having an altitude less than the predetermined altitude $h_{th}$.

In the present configuration example 3, a switching between the simultaneous communication process and the time-division duplex process is performed by a switching control section 23e and a changeover switch 23f. Specifically, the altitude specifying section 23d performs a process of specifying (estimating) the altitude of the upper-airspace terminal 40A in the upper-airspace cell 200A, and sends the processing result (specified altitude) to the switching control section 23e.

The switching control section 23e determines whether or not the altitude related to the received processing result is equal to or higher than the predetermined altitude $h_{th}$, and switches the processing mode of the changeover switch 23f to the simultaneous communication process when determining that the altitude is equal to or higher than the predetermined altitude $h_{th}$. As a result, the simultaneous communication process is respectively performed for the upper-airspace terminal 40A in the upper-airspace cell 200A and the terrestrial terminal 30A to which the same frequency resource as the upper-airspace terminal 40A is assigned in the terrestrial cell 100A.

On the other hand, the switching control section 23e switches the processing mode of the changeover switch 23f to the time-division duplex process when determining that the altitude related to the received processing result is less than the predetermined altitude $h_{th}$. As a result, the time-division duplex process is respectively performed for the upper-airspace terminal 40A in the upper-airspace cell 200A and the terrestrial terminal 30A to which the same frequency resource as the upper-airspace terminal 40A is assigned in the terrestrial cell 100A.

According to the present configuration example 3, it is possible to achieve both of the stable suppression of interference between the terminal apparatuses 30A and 40A, which are respectively located in the vertically adjacent terrestrial cell 100A and the upper-airspace cell 200A and the improvement in frequency utilization efficiency at a high level.

Figure 11C:
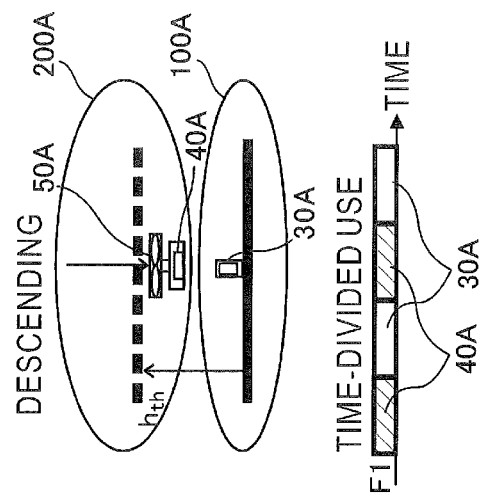
FIG. 11C is an illustration showing a switching between a time-division duplex process and a simultaneous communication process, according to a movement of a drone.
Figure 11B:
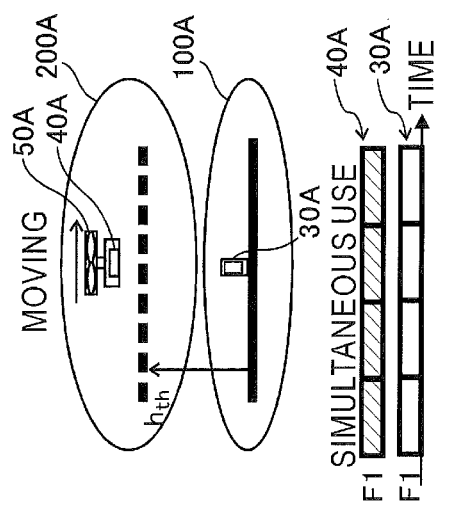
FIG. 11B is an illustration showing a switching between a time-division duplex process and a simultaneous communication process, according to a movement of a drone.
Figure 11A:
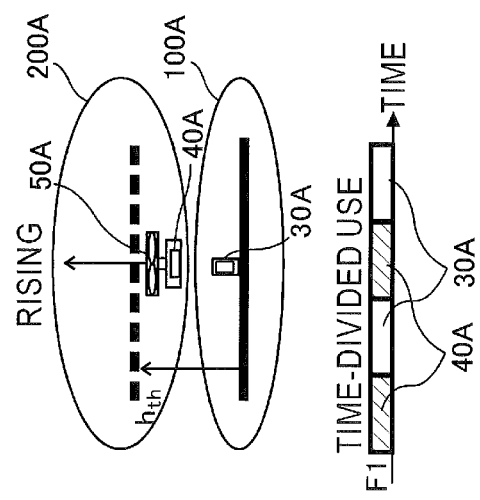
FIG. 11A is an illustration showing a switching between a time-division duplex process and a simultaneous communication process, according to a movement of a drone.

According to the present configuration example 3, for example, it is possible to appropriately cope with movements of the drone 50A as shown in FIG. 11A to FIG. 11C. That is, the drone 50A normally first rises from the terrestrial cell 100A toward the upper-airspace cell 200A to the target altitude, as shown in FIG. 11A. Then, while the altitude of the drone 50A is less than the predetermined altitude $h_{th}$ in the upper-airspace cell 200A, the time-division duplex process is performed. After that, when the drone 50A reaches the predetermined altitude $h_{th}$ or higher in the upper-airspace cell 200A as shown in FIG. 11B, the time-division duplex process is switched to the simultaneous communication process. On the other hand, when the drone 50A descends in the upper-airspace cell 200A toward the terrestrial cell 100A and the altitude becomes less than the predetermined altitude $h_{th}$ as shown in FIG. 11C, the simultaneous communication process is switched to the time-division duplex process.

The altitude estimation process performed by the altitude specifying section 23d is not particularly limited as long as it can specify (estimate) the altitude of the terminal apparatus 40A in the upper-airspace cell 200A. For example, the base station apparatus 21 of the base station 20A may receive the measurement result of the altimeter mounted on the drone 5 from the terminal apparatus 40A, and the altitude specifying section 23d may specify the altitude of the terminal apparatus 40A based on the received measurement result.

Further, for example, the altitude specifying section 23d may specify the altitude of the upper-airspace terminal 40A based on control information when the beam control section 23c-1 performs a beam control.

Figure 12A:
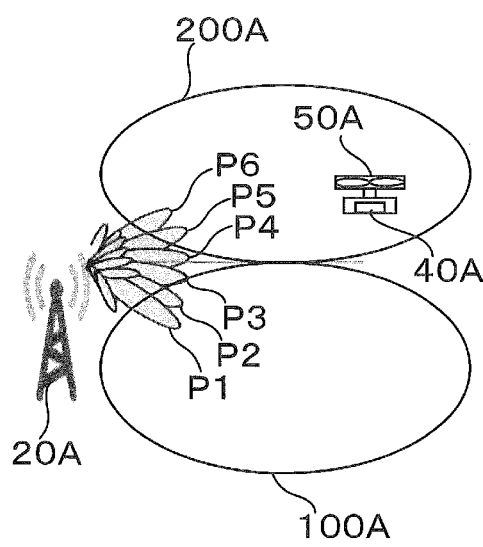
FIG. 12A is an illustration showing an example of specifying an altitude of an upper-airspace terminal using a beamforming function by a precoding control.

For example, as shown in FIG. 12A, the altitude of the upper-airspace terminal 40A may be specified using the selection result (control information) of the beam pattern (precoding weight matrix) when the beam control section 23c-1 controls the precoding control sections 23b-1 and 23b-2 to perform a codebook type beamforming control. In this case, the plural beam patterns (precoding weight matrices) P1 to P6, which are prepared in advance, respectively includes plural highly directional beam whose directions (beam directions in the vertical direction) are different from each other as shown in FIG. 12A. Therefore, the direction of the upper-airspace terminal 40A as viewed from the base station 20A can be specified from the selection result of the beam pattern (for example, beam pattern P5) selected for the upper-airspace terminal 40A, and the altitude of the upper-airspace terminal 40A can be estimated. At this time, if information on the distance between the terminal apparatus 40A and the base station 20A is also used based on the reception power and transmission power during the communication with the terminal apparatus 40A, the altitude estimation can be performed with higher accuracy.

Figure 12B:
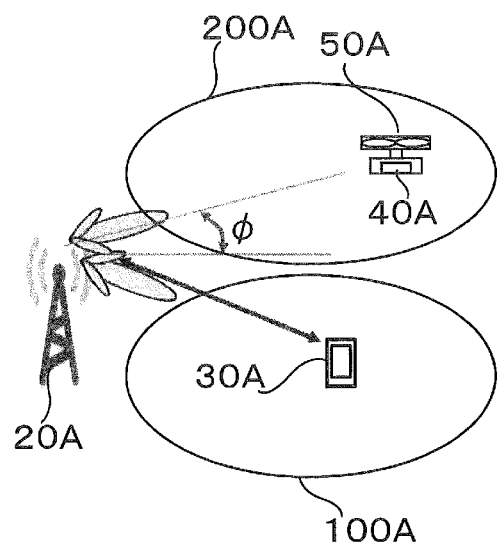
FIG. 12B is an illustration showing an example of specifying an altitude of an upper-airspace terminal using a beamforming function by a continuous tracking control.

For example, in the case of adopting a beam forming function by a continuous tracking control that continuously tracks the beam in the direction of the terminal apparatus, the altitude of the upper-airspace terminal 40A may be specified using information on the beam angle 9 (angle of the beam direction in the virtual vertical plane of the antenna 26 with respect to the horizontal plane), which is control information for the continuous tracking control, as shown in FIG. 12B. In this case, the direction of the upper-airspace terminal 40A viewed from the base station 20A can be specified from the beam angle 9, and the altitude of the upper-airspace terminal 40A can be estimated. In this case as well, if information on the distance between the upper-airspace terminal 40A and the base station 20A is also used based on the reception power and transmission power during the communication with the upper-airspace terminal 40A, the altitude estimation can be performed with higher accuracy.

Figure 13:
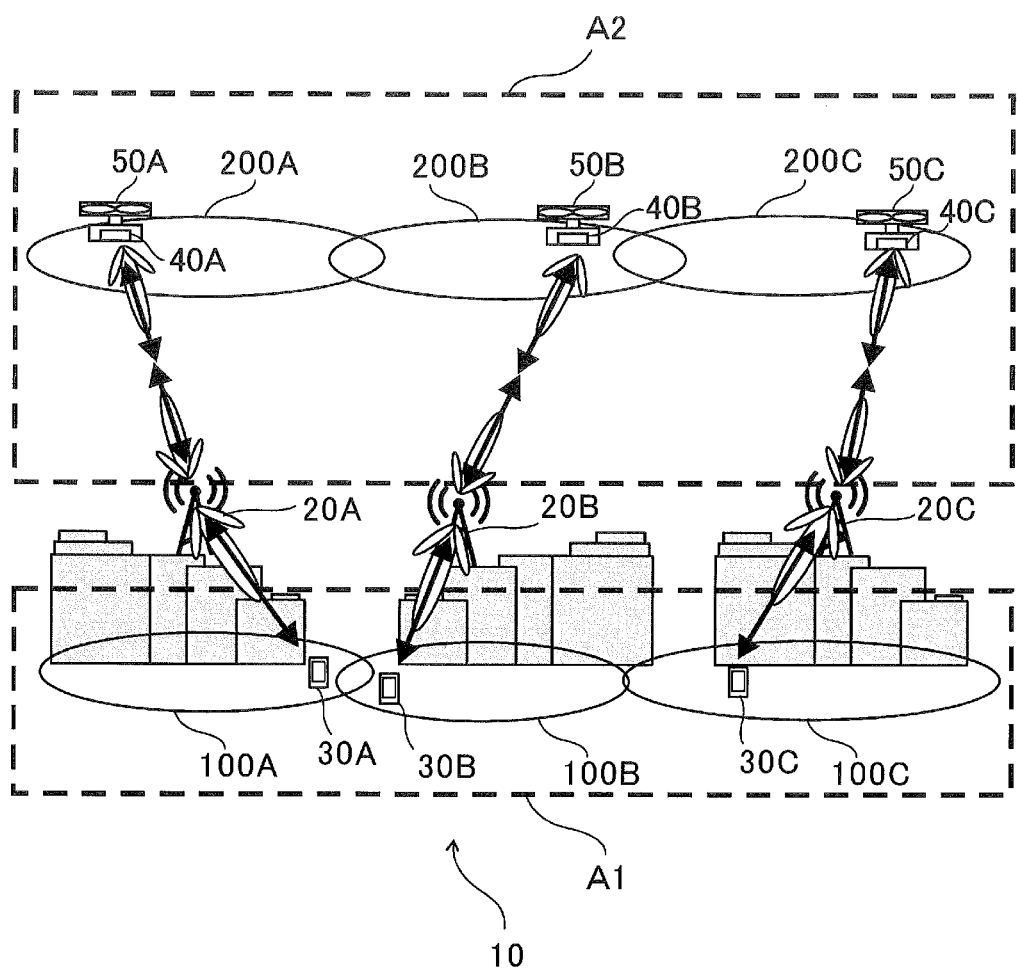
FIG. 13 is an illustration showing an example in which an upper-airspace terminal has a beamforming function.

In the above-described embodiment (including each configuration example), the upper-airspace terminal 40A may be provided with the beam forming function, and the beam formed by the antenna of the upper-airspace terminal 40A may be controlled to be directed toward the base station 20A as shown in FIG. 13. Specifically, for example, a terminal control section is provided in the base station apparatus 21, information for specifying the direction of the base station apparatus 21 as viewed from the upper-airspace terminal 40A is generated by the terminal control section and sent from the base station apparatus 21 of the base station 20A to the upper-airspace terminal 40A. The upper-airspace terminal 40A forms the beam by the beamforming function so that the beam faces the direction of the base station 20A specified based on the information received from the base station 20A.

By such beamforming function in the upper-airspace terminal 40A, the transmission/reception power of the terminal apparatus 40A in the upper-airspace cell 200A is concentrated in the direction of the base station 20A, thereby the antenna gain is improved, accordingly the communication quality, etc. can be improved.

Further, as shown in FIG. 13, since the antenna gain is improved by performing a control so that the beam formed by the antenna of the upper-airspace terminal 40A in the upper-airspace cell 200A is directed toward the base station 20A, it is possible to reduce the transmission power in the terminal apparatuses 30A and 40A by performing a transmission power control in the upper-airspace terminal 40A. As a result, the interference between the terrestrial cell 100A and the upper-airspace cell 200A, which are vertically adjacent to each other, can be further suppressed.

In addition, since the antenna gain is improved as described above, the transmission power of the upper-airspace terminal 40A in directions other than the direction of the base station 20A is reduced. As a result, the uplink radio waves from the upper-airspace terminal 40A are less likely to affect the other base stations 20B and 20C in the vicinity, and a giving interference from the upper-airspace terminal 40A can be suppressed.

It is noted that, the process steps and configuration elements of the radio communication system and the terminal apparatus (UE, user apparatus, mobile station) described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various kinds of radio communication apparatuses, Node B, terminal apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, each section used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus and storage apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: radio communication system
20A to 20C: base station
21: base station apparatus
22: scheduler
23: radio communication section
23-1: radio communication section for upper-airspace cell
23-2: radio communication section for terrestrial cell
23a-1, 23a-2: transmission/reception section
23b-1, 23b-2: precoding control section
23c-1, 23c-2: beam control section
23d: altitude specifying section
23e: switching control section
23f: changeover switch
26: antenna
26a: antenna element
30A to 30C: terminal apparatus (terrestrial terminal)
40A to 40C: terminal apparatus (upper-airspace terminal)
50A to 50C: drone
100A to 100C: terrestrial cell
105: beam for ground
200A to 200C: upper-airspace cell
205: beam for upper airspace
A1: terrestrial area
A2: upper-airspace area

The invention claimed is:

1. A radio communication system with a mobile-communication cellular configuration in which a plurality of base stations are disposed in a same service area, each of the plurality of base stations comprising:
   an antenna;
   a radio communication section for forming a first cell of configuring a ground-side cellular located below the antenna and a second cell of configuring a upper-airspace-side cellular located above the first cell, and performing a radio communication via the antenna to and from a terminal apparatus in the first cell and a terminal apparatus in the second cell, the first cell and the second cell being capable of using a same frequency band;
   a resource assignment section for assigning a radio resource of the same frequency band to a communication with the terminal apparatus in any one cell of the first cell and the second cell in a same time period, and not assigning the radio resource of the same frequency band to a communication with a terminal apparatus in an other cell, and
   wherein each of the plurality of base stations applies a transmission power control for reducing a transmission power to a terminal apparatus having the radio resource of the same frequency band assigned thereto, when assigning the radio resource of the same frequency band to the terminal apparatus in the second cell.

2. A radio communication system with a mobile-communication cellular configuration in which a plurality of base stations are disposed in a same service area, each of the plurality of base stations comprising:
   an antenna;
   a radio communication section for forming a first cell of configuring a ground-side cellular located below the antenna and a second cell of a configuring a upper-airspace-side cellular located above the first cell, and performing a radio communication via the antenna to and from a terminal apparatus in the first cell and a terminal apparatus in the second cell, the first cell and the second cell being capable of using a same frequency band;
   a resource assignment section for assigning a radio resource of the same frequency band to each of a communication with the terminal apparatus in the first cell and a communication with the terminal apparatus in the second cell in a same time period, and
   wherein each of the plurality of base stations applies a transmission power control for reducing a transmission power to a terminal apparatus in the second cell having the radio resource of the same frequency band is assigned thereto.

3. A radio communication system with a mobile-communication cellular configuration in which a plurality of base stations are disposed in a same service area, each of the plurality of base stations comprising:
   an antenna;
   a radio communication section for forming a first cell of configuring a ground-side cellular located below the antenna and a second cell of configuring a upper-airspace-side cellular located above the first cell, and performing a radio communication via the antenna to and from a terminal apparatus in the first cell and a terminal apparatus in the second cell, the first cell and the second cell being capable of using a same frequency band;
   an altitude specifying section for specifying an altitude of the terminal apparatus in the second cell; and
   a resource assignment section for assigning a radio resource of the same frequency band to each of a communication with the terminal apparatus in the first cell and a communication with the terminal apparatus in the second cell, so that the terminal apparatus in the first cell and the terminal apparatus in the second cell time-divisionally use the same frequency band when the altitude of the terminal apparatus in the second cell becomes less than a predetermined altitude, and the terminal apparatus in the first cell and the terminal apparatus in the second cell simultaneously use the same frequency band when the altitude of the terminal apparatus in the second cell becomes equal to or higher than the predetermined altitude.

4. The radio communication system according to claim 3, wherein the antenna is capable of forming a beam of the first cell and a beam of the second cell, and
wherein each of the plurality of base stations determines that the altitude of the terminal apparatus in the second cell becomes equal to or higher than the predetermined altitude, in case that the terminal apparatus in the second cell selects the beam of the second cell.

5. The radio communication system according to claim 3, wherein the antenna is capable of continuously changing a direction of a beam in a virtual vertical plane centered on the antenna, and
wherein each of the plurality of base stations determines that the altitude of the terminal apparatus in the second cell is equal to or higher than the predetermined altitude, in case that an upward angle of the direction of the beam in the virtual vertical plane of the antenna with respect to the horizontal plane is equal to or higher than a predetermined angle.

6. The radio communication system according to claim 1, wherein the antenna is capable of forming a plurality of beams having directivities in mutually different directions in a virtual vertical plane centered on the antenna, and
wherein each of the plurality of base stations comprises a control section for performing a beamforming control of the antenna so as to form one or more beams forming the first cell and one or more beams forming the second cell.

7. The radio communication system according to claim 6, wherein the antenna is a Massive antenna in which a plurality of antenna elements are disposed, and
wherein the control section:
stores amplitude and phase values for each antenna element of the antenna, with respect to a plurality of preset beam candidates in mutually different directions;
selects one of the plurality of beam candidates based on beam selection information received from the terminal apparatus; and
performs a beamforming control so as to form a beam used for a communication with the terminal apparatus based on the amplitude and phase of each antenna element stored for the selected beam candidate.

8. The radio communication system according to claim 6, wherein the antenna is a Massive antenna in which a plurality of antenna elements are disposed, and
wherein the control section:
receives radio waves from the terminal apparatus while changing a pointing direction of the antenna in a virtual vertical plane centered on the antenna;
detects a direction in which a reception power of radio waves from the terminal apparatus is maximized; and
performs a beamforming control so as to form a beam used for a communication with the terminal apparatus in the detected direction.

9. The radio communication system according to claim 1, further comprising:
a terminal control section for transmitting control information to the terminal apparatus so that the beam formed by the antenna of the terminal apparatus in the second cell is directed toward each of the plurality of base stations.

10. The radio communication system according to claim 1, further comprising:
a terminal apparatus for performing a radio communication with each of the plurality of base stations.

11. The radio communication system according to claim 2,
wherein the antenna is capable of forming a plurality of beams having directivities in mutually different directions in a virtual vertical plane centered on the antenna, and
wherein each of the plurality of base stations includes a control section for performing a beamforming control of the antenna so as to form one or more beams forming the first cell and one or more beams forming the second cell.

12. The radio communication system according to claim 3,
wherein the antenna is capable of forming a plurality of beams having directivities in mutually different directions in a virtual vertical plane centered on the antenna, and
wherein each of the plurality of base stations includes a control section for performing a beamforming control of the antenna so as to form one or more beams forming the first cell and one or more beams forming the second cell.

13. The radio communication system according to claim 11,
wherein the antenna is a Massive antenna in which a plurality of antenna elements are disposed, and
wherein the control section:
stores amplitude and phase values for each antenna element of the antenna, with respect to a plurality of preset beam candidates in mutually different directions;
selects one of the plurality of beam candidates based on beam selection information received from the terminal apparatus; and
performs a beamforming control so as to form a beam used for a communication with the terminal apparatus based on the amplitude and phase of each antenna element stored for the selected beam candidate.

14. The radio communication system according to claim 12,
wherein the antenna is a Massive antenna in which a plurality of antenna elements are disposed, and
wherein the control section:
stores amplitude and phase values for each antenna element of the antenna, with respect to a plurality of preset beam candidates in mutually different directions;
selects one of the plurality of beam candidates based on beam selection information received from the terminal apparatus; and
performs a beamforming control so as to form a beam used for a communication with the terminal apparatus based on the amplitude and phase of each antenna element stored for the selected beam candidate.

15. The radio communication system according to claim 11,
wherein the antenna is a Massive antenna in which a plurality of antenna elements are disposed, and
wherein the control section:
receives radio waves from the terminal apparatus while changing a pointing direction of the antenna in a virtual vertical plane centered on the antenna;
detects a direction in which a reception power of radio waves from the terminal apparatus is maximized; and
performs a beamforming control so as to form a beam used for a communication with the terminal apparatus in the detected direction.

16. The radio communication system according to claim 12,
wherein the antenna is a Massive antenna in which a plurality of antenna elements are disposed, and
wherein the control section:
receives radio waves from the terminal apparatus while changing a pointing direction of the antenna in a virtual vertical plane centered on the antenna;
detects a direction in which a reception power of radio waves from the terminal apparatus is maximized; and
performs a beamforming control so as to form a beam used for a communication with the terminal apparatus in the detected direction.

17. The radio communication system according to claim 2, further comprising:
a terminal control section for transmitting control information to the terminal apparatus so that the beam formed by the antenna of the terminal apparatus in the second cell is directed toward each of the plurality of base stations.

18. The radio communication system according to claim 3, further comprising:
a terminal control section for transmitting control information to the terminal apparatus so that the beam formed by the antenna of the terminal apparatus in the second cell is directed toward each of the plurality of base stations.

* * * * *